(12) United States Patent
Shintani

(10) Patent No.: US 7,972,069 B2
(45) Date of Patent: Jul. 5, 2011

(54) CAMERA SYSTEM AND CAMERA BODY

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/554,055

(22) Filed: Sep. 4, 2009

(65) Prior Publication Data

US 2010/0061715 A1 Mar. 11, 2010

(30) Foreign Application Priority Data

Sep. 11, 2008 (JP) ................. 2008-233221

(51) Int. Cl.
*G03B 9/08* (2006.01)

(52) U.S. Cl. ...................................... 396/452

(58) Field of Classification Search ............ 396/452
See application file for complete search history.

(56) References Cited

U.S. PATENT DOCUMENTS 7,657,174 B2 * 2/2010 Arai .............................. 396/535
7,692,716 B2 * 4/2010 Wakabayashi ................ 348/362

FOREIGN PATENT DOCUMENTS

| JP | 2004-341089 A | 12/2004 |
| JP | 2005-266152 A | 9/2005 |
| JP | 2007-183483 A | 7/2007 |

* cited by examiner

*Primary Examiner* — Rodney E Fuller
(74) *Attorney, Agent, or Firm* — Panasonic Patent Center; Dhiren Odedra; Kerry Culpepper

(57) ABSTRACT

A camera body includes a body mount that supports an attachable lens unit, an imaging element that captures an optical image of a subject and generates image data, a shutter unit disposed between the body mount and the imaging element, a protecting plate that has a first condition of shielding an opening of the shutter unit and a second condition of retracting from the opening of the shutter unit, a motor that drives the protecting plate, a power source operable to supply power, and a camera controller that controls the motor before power supply from the power source is stopped, so that the protecting plate is in the first condition when the power supply from the power source is stopped.

12 Claims, 12 Drawing Sheets

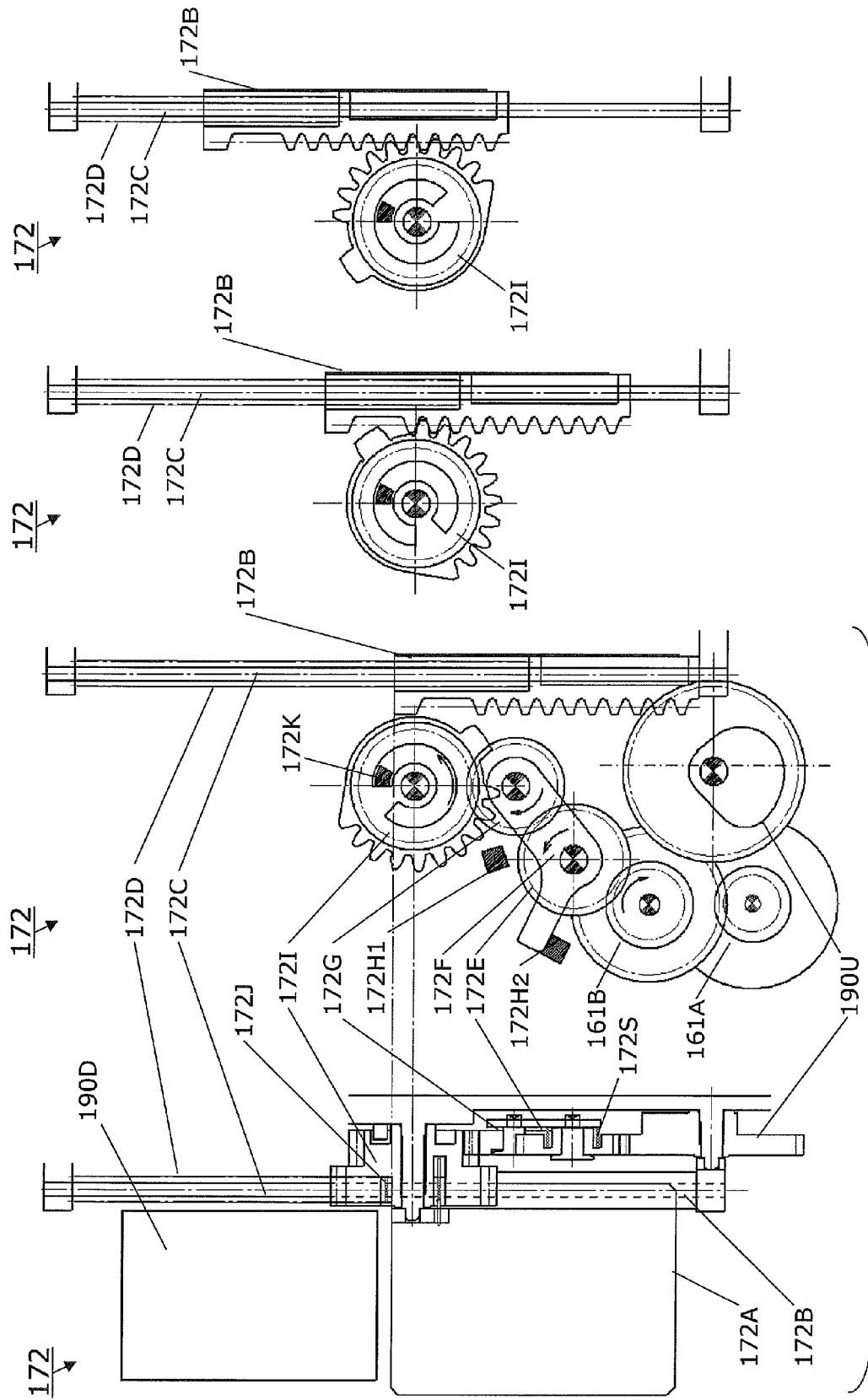

CAMERA SYSTEM AND CAMERA BODY

CROSS-REFERENCE TO RELATED APPLICATIONS

This application claims priority to Japanese Patent Application No 2008-233221 filed on Sep. 11, 2008, the entire disclosure of which is hereby incorporated herein by reference.

BACKGROUND

1. Technical Field

This technology relates to digital camera systems primarily for capturing still images and camera systems such as video cameras primarily for capturing moving images. In particular, it relates to camera systems having an interchangeable lens unit, and camera body to which the interchangeable lens unit can be attached.

2. Description of the Related Art

Japanese Laid-Open Patent Application 2005-266152 discloses a single-lens reflex camera. This camera is a digital camera having a CCD (charge coupled device). This camera includes a lens unit and a camera body. This camera body has an imaging element such as a CCD (charge coupled device) image sensor, and a mirror box device disposed between the lens unit and the imaging element. The mirror box device guides the light that has passed through the lens unit to either a CCD image sensor or a prism. The light guided to the prism is guided to a viewfinder.

The lens unit is detachable from this camera. For this reason, there are cases where dust entering through the body mount adheres to the surfaces of optical members near the imaging element. There are cases where the shadow of the dust is captured in the image during image capturing. Therefore, in this camera, a protecting shutter is inserted between the shutter and the optical members near the imaging element. The protecting shutter is inserted in response to an operation of a lever. The protecting shutter of a second camera disclosed in JP 2005-266152A is inserted in response to an operation of detaching the lens unit.

SUMMARY

The protecting shutter of the camera disclosed in Japanese Laid-Open Patent Application 2005-266152 is inserted in response to the user's operation of a lever. For this reason, there is a possibility that the protecting shutter is left open if the user forgets to operate the lever. The protecting shutter of the second camera disclosed in Japanese Laid-Open Patent Application 2005-266152 is inserted in response to the user's operation of detaching the lens unit. For this reason, unless a specifically designed lens unit is used, the protecting shutter is not opened, so that the camera cannot perform image capturing with a non-designed lens unit.

An object of the technology disclosed herein is to solve this problem and provide a highly reliable camera body of an interchangeable-lens-type digital camera.

A camera body disclosed herein comprising:
a body mount that supports an attachable lens unit;
an imaging element that captures an optical image of a subject and generates image data;
a shutter unit disposed between the body mount and the imaging element;
a protecting plate that has a first condition of shielding an opening of the shutter unit and a second condition of retracting from the opening of the shutter unit;
a motor that drives the protecting plate;
a power source operable to supply power; and
a camera controller that controls the motor before power supply from the power source is turned off, so that the protecting plate is in the first condition when the power supply from the power source is off.

An another camera body disclosed herein comprising:
a body mount that supports an attachable lens unit;
an imaging element that captures an optical image of a subject and generates image data;
a protecting plate that has a first condition of shielding an opening of the body mount and a second condition of retracting from the opening of the body mount;
a motor that drives the protecting plate;
a power source operable to supply power; and
a camera controller that controls the motor before power supply from the power source is turned off, so that the protecting plate is in the first condition when the power supply from the power source is off.

According to the technology disclosed herein, a highly reliable interchangeable-lens-type digital camera can be provided.

BRIEF DESCRIPTION OF THE DRAWINGS

Referring now to the attached drawings which form a part of this original disclosure:

FIGS. 7(a) to 7(c) are schematic diagrams for explaining the driving mechanism of a protecting plate 172A of a first embodiment.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Overview of Digital Camera

Figure 1:
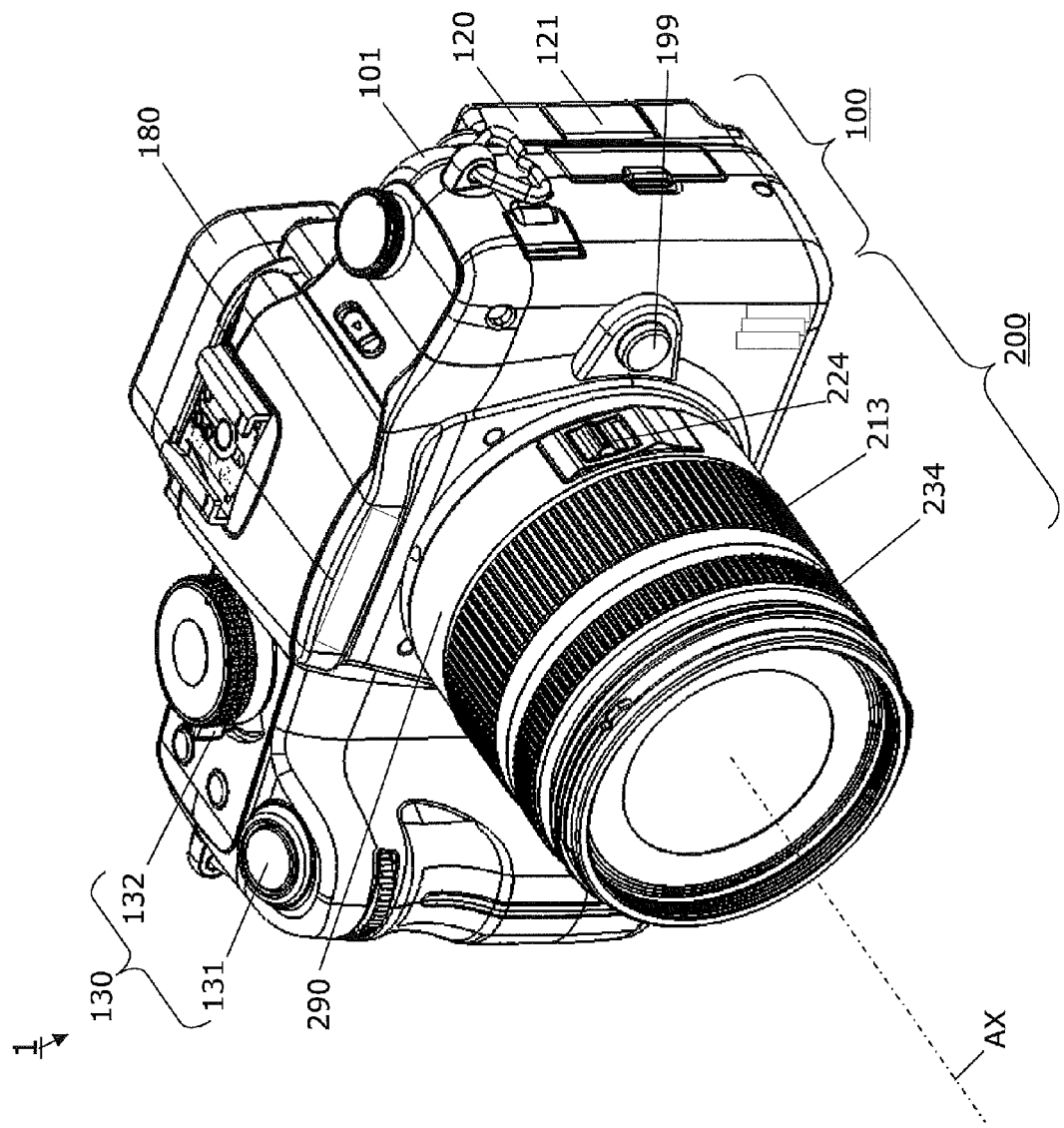
FIG. 1 is an oblique view of a digital camera 1.
Figure 2:
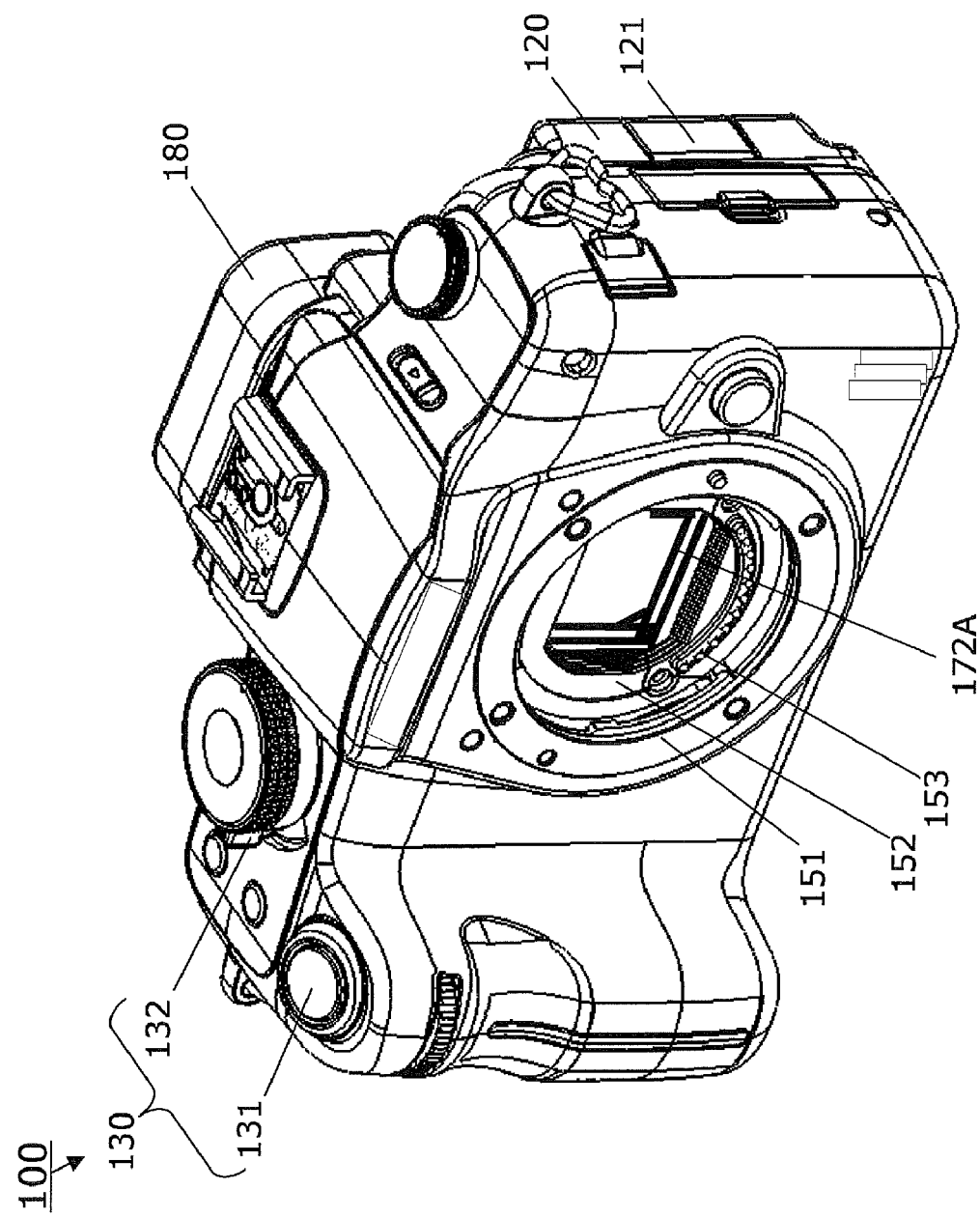
FIG. 2 is an oblique view of a camera body 100.
Figure 3:
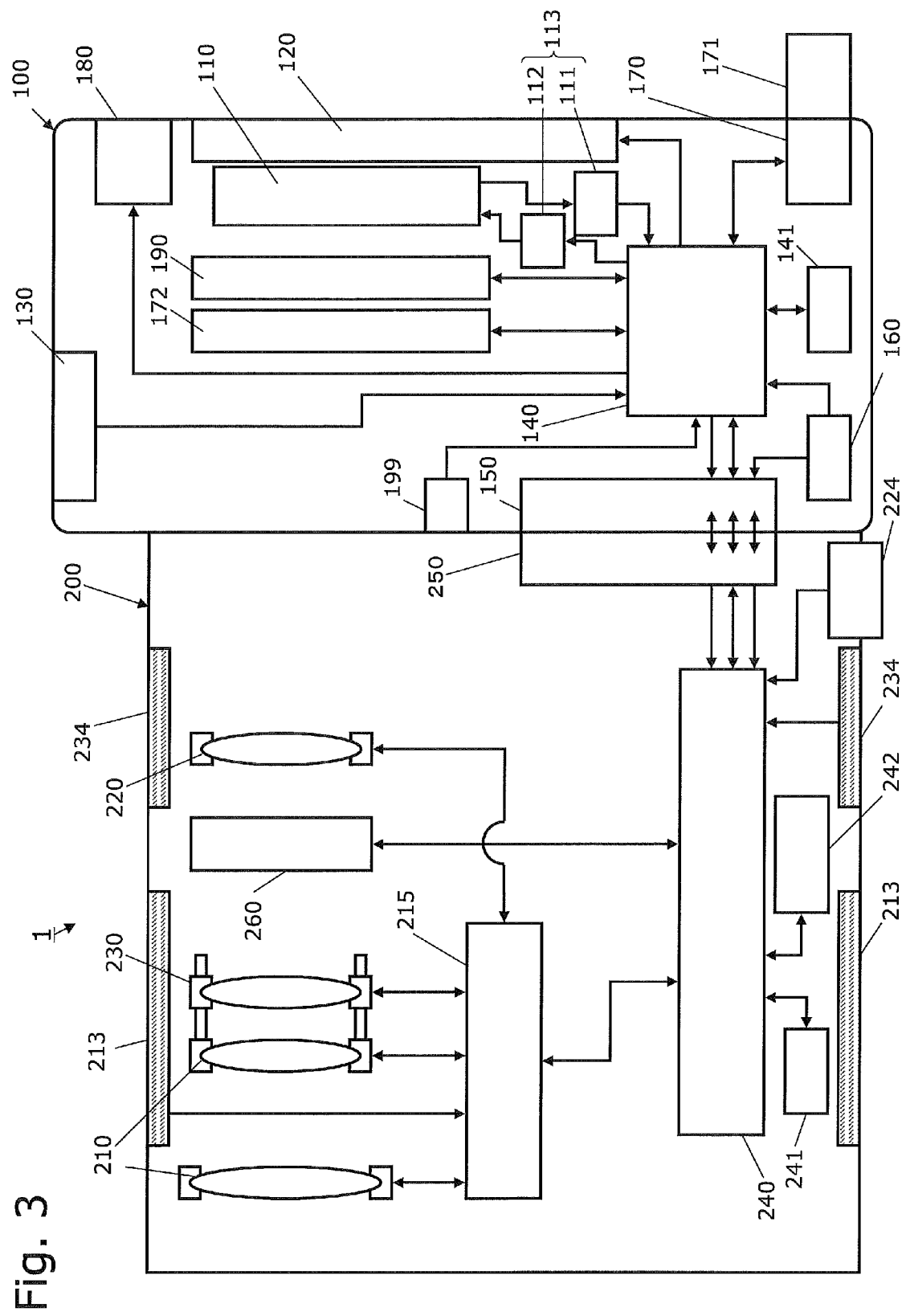
FIG. 3 is a block diagram of the digital camera 1.

FIG. 1 is an oblique view of a digital camera 1 according to a first embodiment. FIG. 2 is an oblique view of a camera body 100. FIG. 3 is a function block diagram of the digital camera 1.

The digital camera 1 is an interchangeable lens digital camera, and includes the camera body 100 and a lens unit 200 that can be mounted to the camera body 100.

Unlike a single lens reflex camera, the camera body 100 does not have a mirror box device, so the flange back is smaller than with a single lens reflex camera. Also, reducing the size of the flange back makes the camera body 100 smaller. Furthermore, reducing the size of the flange back affords greater latitude in the design of the optical system, so the lens unit 200 can be smaller. The various components will now be described in detail.

For the sake of this description, the subject side of the digital camera 1 will also be called the front, the vertical upper side when the digital camera 1 is in its usual orientation (hereinafter referred to as landscape orientation) will be called the upper side or above, and the vertical lower side will be called the lower side or below.

2: Configuration of Camera Body

Figure 4:
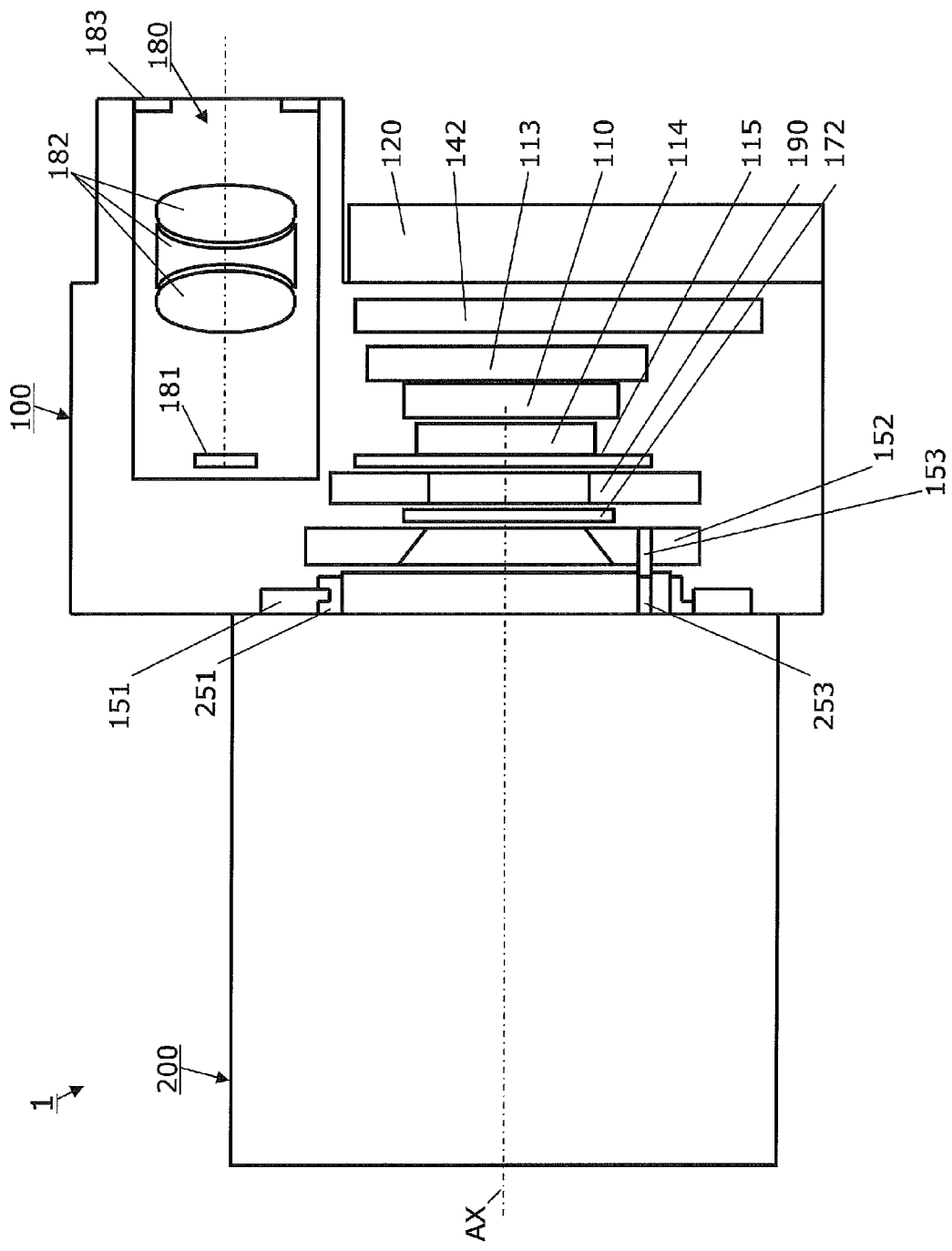
FIG. 4 is a simplified cross section of the digital camera 1.
Figure 5:
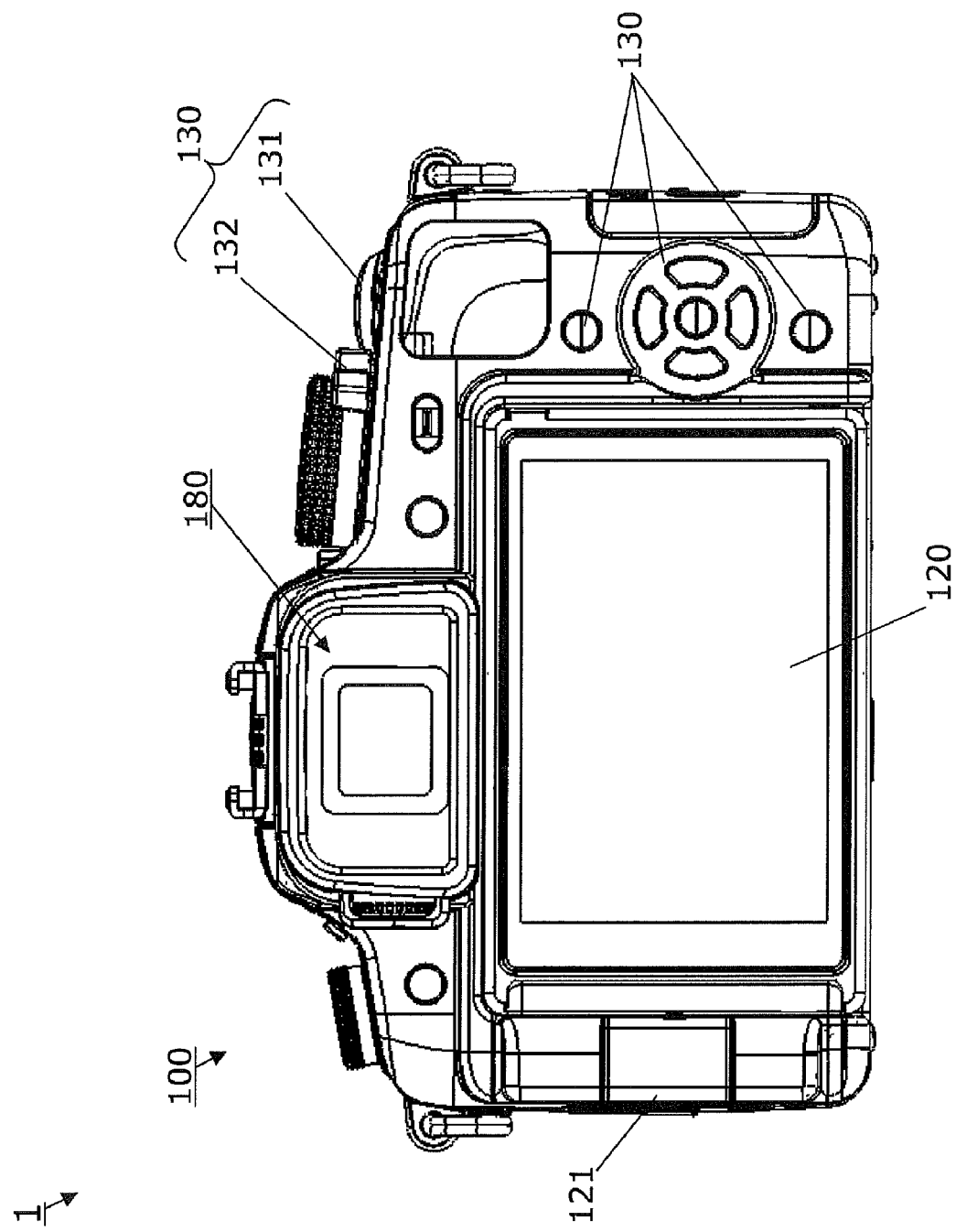
FIG. 5 is a rear view of the digital camera 1.

FIG. 4 is a simplified cross section of the digital camera 1. FIG. 5 is a rear view of the digital camera 1. The camera body 100 mainly includes the CMOS (complementary metal oxide semiconductor) image sensor 110, a CMOS circuit board 113, a camera monitor 120, controls 130 (an example of operation portions), a main circuit board 142 that includes a camera controller 140, a body mount 150, a power source 160, a card slot 170, an electronic viewfinder 180, a shutter unit 190, an optical low-pass filter 114, a diaphragm 115, and a protecting plate unit 172.

The body mount 150, the shutter unit 190, the protecting plate unit 172, the diaphragm 115, the optical low-pass filter 114, the CMOS image sensor 110, the CMOS circuit board 113, the heat radiating plate 195, the main circuit board 142, and the camera monitor 120 are disposed in that order, starting from the front, in the camera body 100.

The CMOS image sensor 110 (an example of the imaging element) converts an optical image of a subject (hereinafter also referred to as a subject image) incident through the lens unit 200 into image data. The image data thus produced is digitized by an A/D converter 111 of the CMOS circuit board 113. The image data digitized by the A/D converter 111 is subjected to various image processing by the camera controller 140. The "various image processing" referred to here includes gamma correction processing, white balance correction processing, scratch correction processing, YC conversion processing, electronic zoom processing, and JPEG compression processing, for example.

The CMOS image sensor 110 operates on the basis of a timing signal produced by a timing generator 112 of the CMOS circuit board 113. The CMOS image sensor 110 can acquire still image data and moving image data by controlling the CMOS circuit board 113. The acquired moving image data is also used for displaying through images. Still image data and moving image data are examples of image data.

The term "through image" here refers to those images, out of the moving image data, that are not recorded to a memory card 171. Through images are mainly moving images, and are displayed on the camera monitor 120 and the electronic viewfinder 180 (hereinafter also referred to as EVF) in order to determine the composition of moving or still images.

The CMOS image sensor 110 is able to acquire high-resolution moving images used for recording, and to acquire low-resolution moving images used as through images. An example of a high-resolution moving image is a moving image in HD size (high definition size: 1920×1080 pixels). The CMOS image sensor 110 is an example of an imaging element that converts an optical image of a subject into an electrical image signal. The concept of imaging element here encompasses CCD image sensors and other such opto-electric conversion elements in addition to the CMOS image sensor 110.

The CMOS circuit board 113 (an example of an imaging element circuit board) is a circuit board that controls the CMOS image sensor 110. The CMOS circuit board 113 is a circuit board that subjects the image data outputted from the CMOS image sensor 110 to specific processing, and includes the timing generator 112 and the A/D converter 111. The CMOS circuit board 113 is an example of an imaging element circuit board that controls the drive of the imaging element and subjects the image data outputted from the imaging element to specific processing such as A/D conversion.

The camera monitor 120 is a liquid crystal display, for example, and displays the image indicated by the display-use image data, for example. The display-use image data is produced by the camera controller 140. This display-use image data is, for example, image data that has undergone image processing, or data for displaying the photography conditions, control menus, and so forth of the digital camera 1. The camera monitor 120 is able to selectively display both still images and moving images.

The camera monitor 120 is provided to the camera body 100. In this embodiment, it is disposed on the rear face of the camera body 100, but the camera monitor 120 may be disposed anywhere on the camera body 100. The angle between the display screen of the camera monitor 120 and the camera body 100 is variable. More specifically, as shown in FIG. 5, the camera body 100 has a hinge 121 that links the camera monitor 120 rotatably with respect to the housing 101. The hinge 121 is disposed on the left end of the housing 101. In more specific terms, the hinge 121 has a first hinge and a second hinge. The camera monitor 120 is able to rotate around the first hinge to the left and right with respect to the housing 101, and is able to rotate around the second hinge up and down with respect to the housing 101.

The camera monitor 120 is an example of the display unit provided to the camera body 100. The display unit can also be an organic EL, an inorganic EL, a plasma display panel, or anything else that can display images. Also, the display unit need not be provided to the rear face of the camera body 100, may instead be on a side face, the upper face, or somewhere else.

The electronic viewfinder 180 displays the image indicated by the display-use image data produced by the camera controller 140, for example. The EVF 180 is able to selectively display both still images and moving images. The EVF 180 and the camera monitor 120 may both display the same content, or may display different content. These are controlled by the camera controller 140. The EVF 180 has an EVF-use liquid crystal monitor 181 that displays images and the like, an EVF-use optical system 182 that enlarges the display of the EVF-use liquid crystal monitor 181, and an eyepiece 183 to which the user puts his eye.

The EVF 180 is also an example of a display unit. It differs from the camera monitor 120 in that the user positions an eye to look through it. The difference in terms of structure is that whereas the EVF 180 has the eyepiece 183, the camera monitor 120 does not have the eyepiece 183.

The proper display brightness is ensured with the EVF-use liquid crystal monitor 181 by providing a back light (not shown) in the case of a transmissive liquid crystal, and providing a front light (not shown) in the case of a reflective liquid crystal. The EVF-use liquid crystal monitor 181 is an example of an EVF-use monitor. This EVF-use monitor can be an organic EL, an inorganic EL, a plasma display panel, or anything else that can display images. In the case of a self-emitting device such as an organic EL, there is no need for an illumination light source.

The controls 130 are operated by the user. More specifically, as shown in FIGS. 1 and 2, the controls 130 include a release button 131 that the user presses to release the shutter, and a power switch 132, which is a rotary dial switch provided to the upper face of the camera body 100. The power switch 132 turns off the power at the first rotation position, and turns on the power at the second rotation position. The controls 130 may be in the form of buttons, levers, dials, a touch panel, or anything else that the user can operate.

The camera controller 140 is a device serving as the functional center of the camera body 100, and controls the various components of the camera body 100. For instance, the camera controller 140 controls the shutter unit 190 so that it is kept open when the power from the power source 160 is shut off. The camera controller 140 also receives commands from the controls 130. The camera controller 140 sends signals for controlling the lens unit 200 through the body mount 150 and a lens mount 250 to a lens controller 240, and indirectly controls the various components of the lens unit 200. Specifically, the camera controller 140 controls the entire digital camera 1.

The camera controller 140 controls the CMOS circuit board 113. More specifically, the camera controller 140 sends a control signal to the CMOS circuit board 113, and the CMOS circuit board 113 controls the CMOS image sensor 110 on the basis of the received control signal. The camera controller 140 also acquires image data that is produced by the CMOS image sensor 110 and has undergone specific processing such as A/D conversion by the CMOS circuit board 113, and performs further processing. For example, the camera controller 140 produces display-use image data or recording-use image data from image data that has been processed by the CMOS circuit board 113.

The camera controller 140 also receives various signals from the lens controller 240 via the body mount 150 and the lens mount 250. The camera controller 140 uses a DRAM 141 as a working memory during control operations and image processing operations. The camera controller 140 is disposed on the main circuit board 142.

The card slot 170 allows the memory card 171 to be mounted. The card slot 170 controls the memory card 171 on the basis of a control signal sent from the camera controller 140. More specifically, the card slot 170 stores image data in the memory card 171. The card slot 170 outputs image data from the memory card 171. The card slot 170 also stores moving image data in the memory card 171. The card slot 170 outputs moving image data from the memory card 171.

The memory card 171 can store image data produced by image processing by the camera controller 140. For example, the memory card 171 can store compressed JPEG image files, or uncompressed raw image files. The memory card 171 also can output image data or image files stored ahead of time, via the card slot 170. The image data or image files outputted from the memory card 171 are subjected to image processing by the camera controller 140. For example, the camera controller 140 subjects the image data or image file acquired from the memory card 171 to expansion processing and produces display-use image data.

The memory card 171 is also able to store moving image data produced by image processing by the camera controller 140. For example, the memory card 171 can store a moving image file compressed according to H.264/AVC, which is a moving image compression standard. The memory card 171 can also output, via the card slot 170, moving image data or moving image files stored ahead of time. The moving image data or moving image files outputted from the memory card 171 are subjected to image processing by the camera controller 140. For example, the camera controller 140 subjects the moving image data or moving image file acquired from the memory card 171 to expansion processing and produces display-use moving image data.

The memory card 171 is also an example of a memory unit. The memory unit may be one that can be mounted to the camera body 100, such as the memory card 171, or may be one that is fixed to the digital camera 1.

The power source 160 supplies the various components with electrical power for use by the digital camera 1. The power source 160 may, for example, be a dry cell, or may be a rechargeable cell. The power source 160 also may be a unit that receives a supply of power from an external power source via a power cord or the like, and supplies this power to the digital camera 1.

The body mount 150 has a body mount ring 151 and an electrical contact 153. The body mount ring 151 mechanically supports the lens unit 200 by mating with a lens mount ring 251. More specifically, the lens mount ring 251 can be inserted in the body mount ring 151, and once inserted in the body mount ring 151, the lens mount ring 251 is able to rotate with respect to the body mount ring 151.

The lens mount ring 251 is inserted into the body mount ring 151, and the lens mount ring 251 is then rotated with respect to the body mount ring 151 until the two mate. When the body mount ring 151 is mated with the lens mount ring 251, the body mount ring 151 mechanically supports the lens unit 200.

In a state in which the lens unit 200 has been mounted to the camera body 100, the electrical contact 153 is in contact with an electrical contact 253 had by the lens mount 250. Thus, the body mount 150 and the lens mount 250 can be electrically connected via the electrical contact 153 of the body mount 150 and the electrical contact 253 of the lens mount 250. Therefore, the camera body 100 sends and receives data and/or control signals to and from the lens unit 200 via the body mount 150 and the lens mount 250. More specifically, the body mount 150 and the lens mount 250 send and receive data and/or control signals to and from the lens controller 240 included in the lens unit 200 and the camera controller 140. Also, the body mount 150 supplies the power received from the power source 160 to the entire lens unit 200 via the lens mount 250.

The shutter unit 190 is a so-called focal-plane shutter. The shutter unit 190 is disposed between the body mount 150 and the CMOS image sensor 110. The shutter unit 190 has a rear curtain 190A, a front curtain 190B and a shutter holding frame 190C. The shutter holding frame 190C has an opening 190D. The shutter unit 190 is capable of being mechanically held in the opened condition. In order that the opened condition is mechanically held under the condition where the power of the camera body 100 is off, the shutter unit 190 is controlled by the camera controller 140 so as to be brought into the opened condition before the power is turned off. To be mechanically held is a concept that the opened condition is held without the use of electric power. For example, to be mechanically held is a concept that the opened condition is held by object-to-object contact or the magnetic force of a permanent magnet.

Figure 6A:
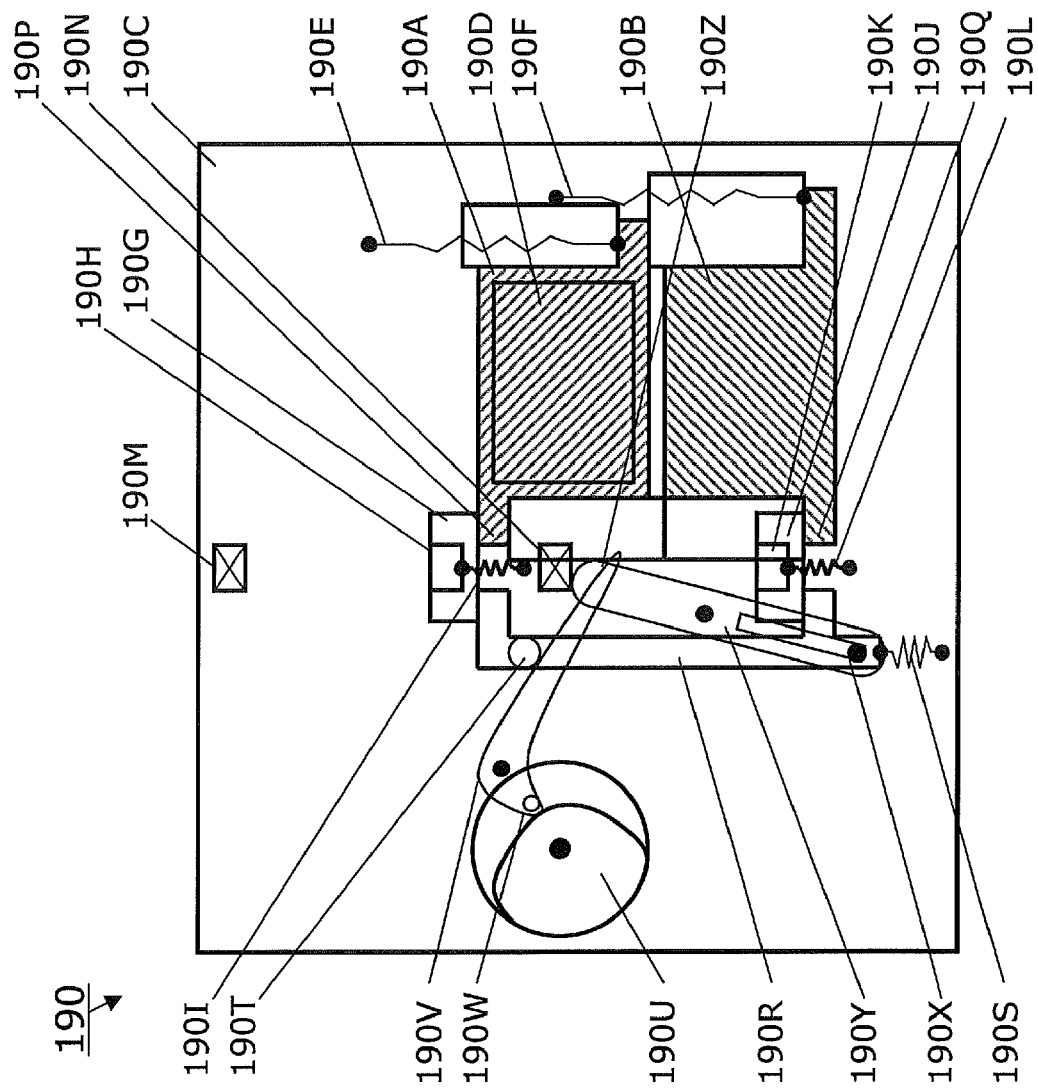
FIG. 6A is a schematic diagram of the closed condition of a shutter unit 190.
Figure 6B:
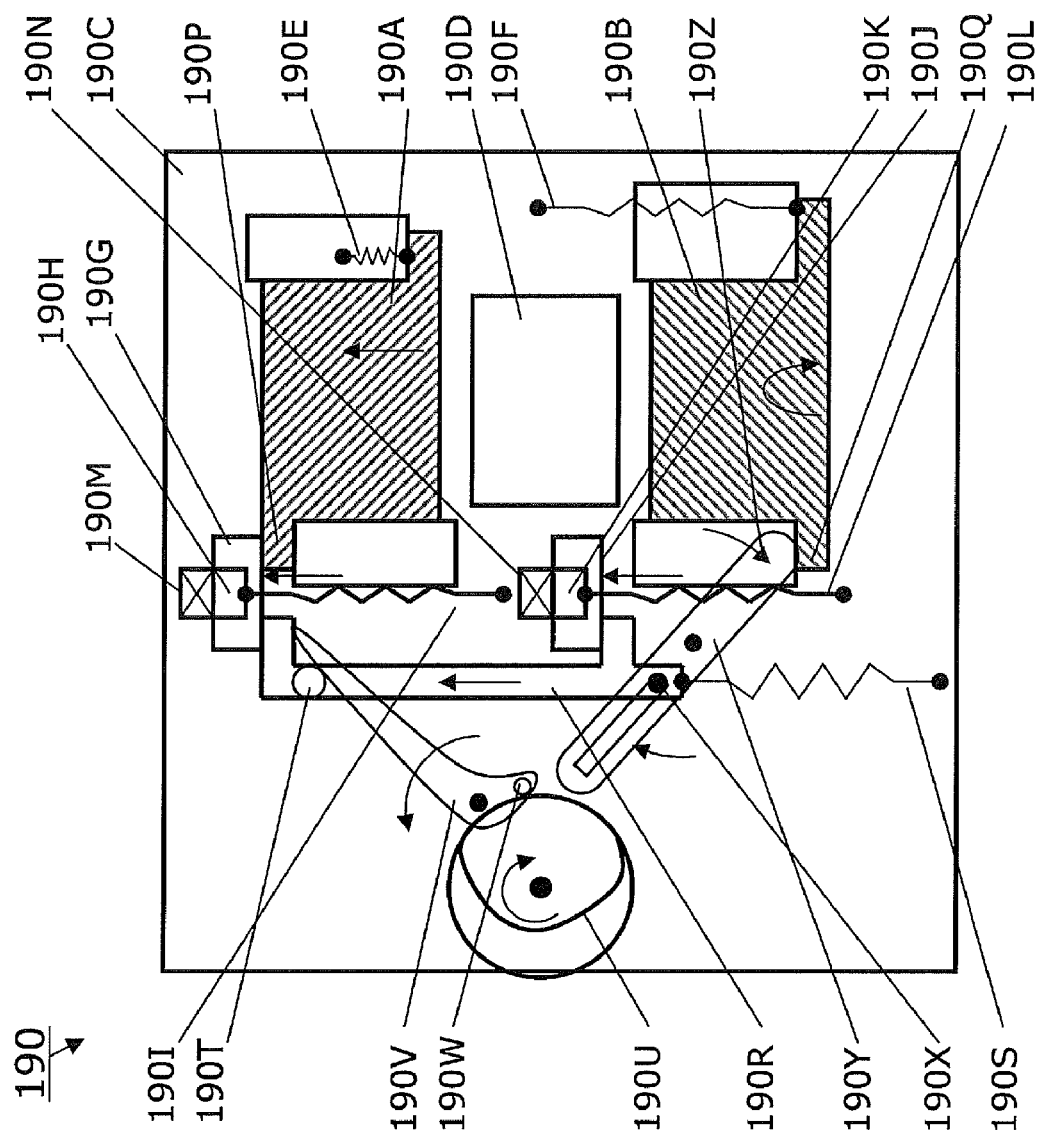
FIG. 6B is a schematic diagram of the opened condition of the shutter unit 190.
Figure 6C:
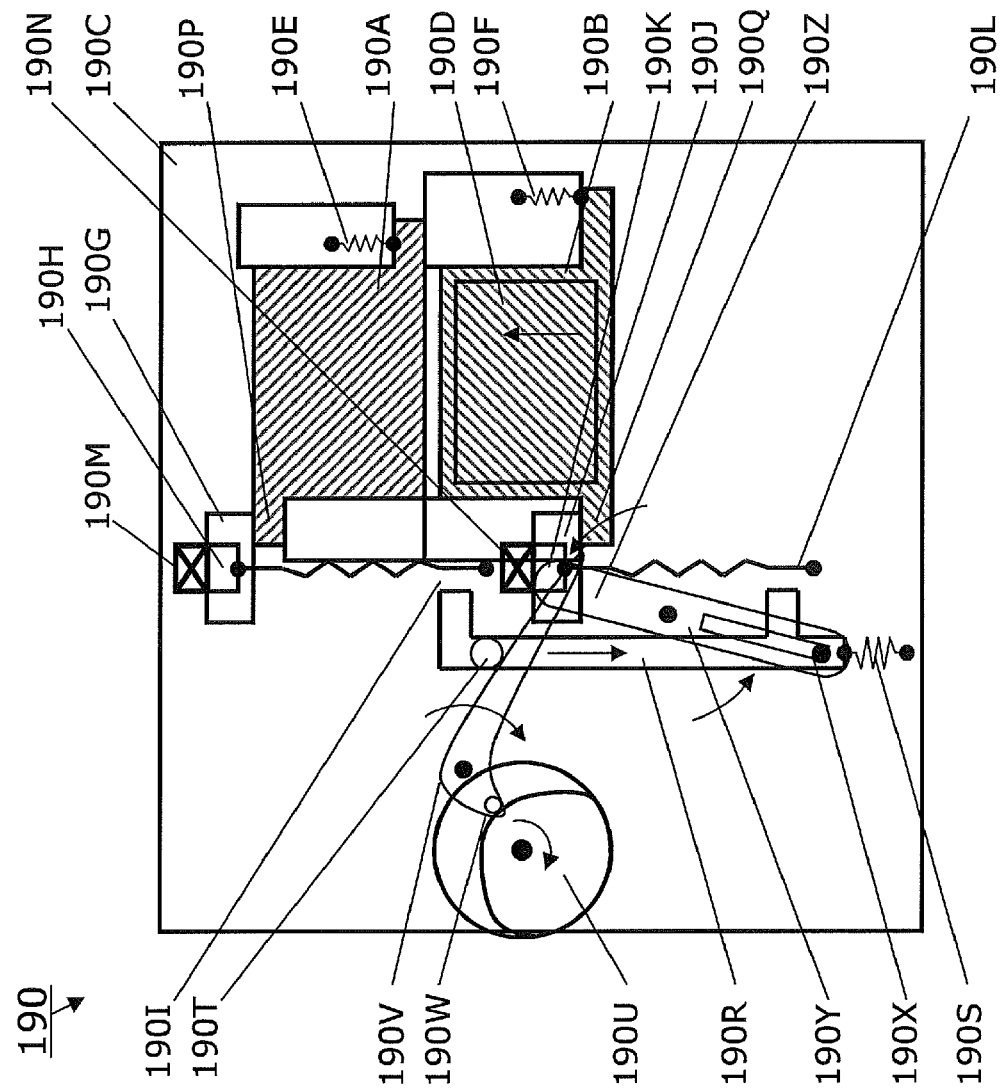
FIG. 6C is a schematic diagram of a run preparation condition of the shutter unit 190.
Figure 6D:
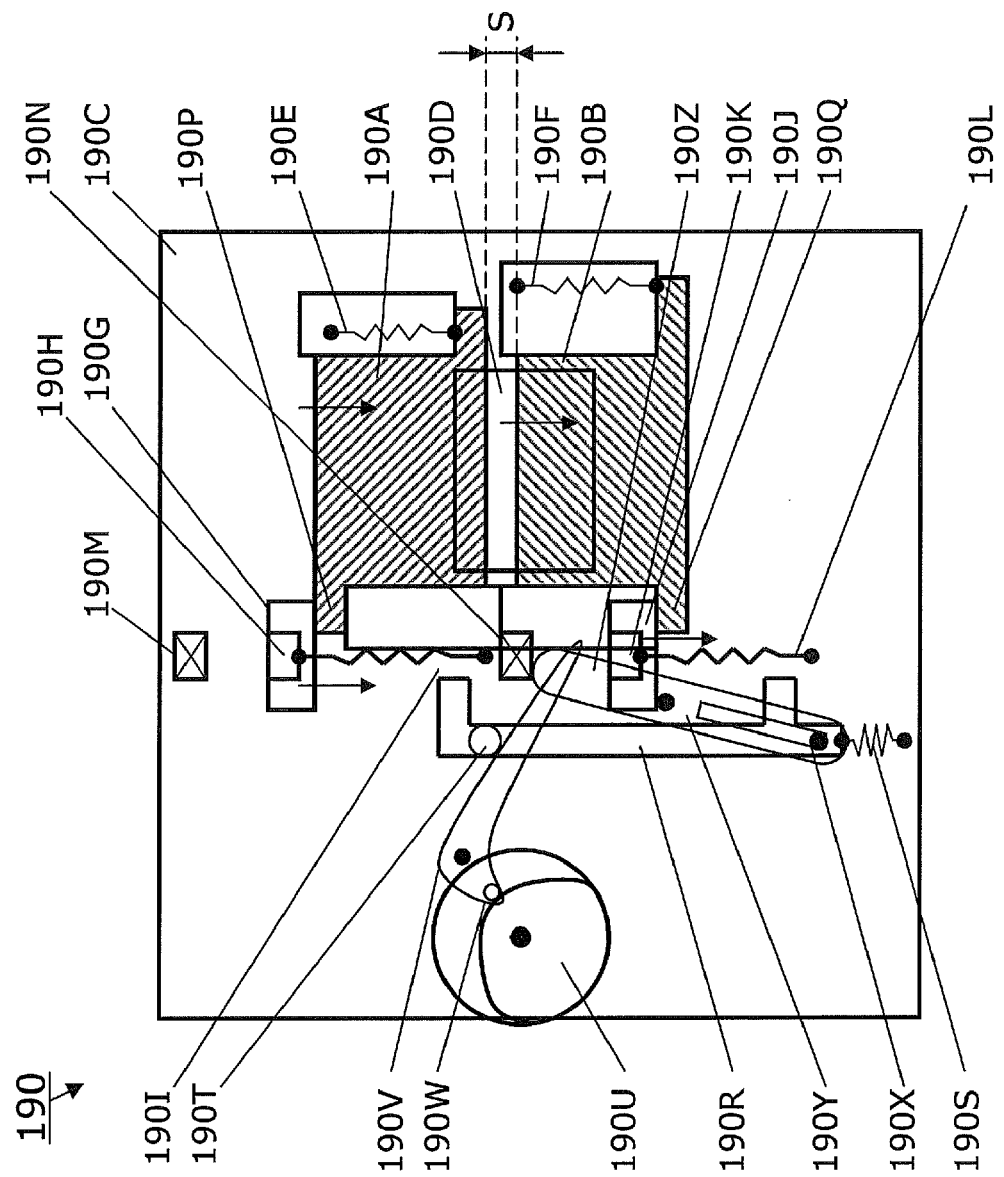
FIG. 6D is a schematic diagram of the shutter unit 190 while it is running.

Hereinafter, an example of the embodiment of the shutter unit 190 will be described with reference to FIGS. 6A to 6D. FIG. 6A is a schematic diagram of the closed condition of the shutter unit 190. FIG. 6B is a schematic diagram of the opened condition of the shutter unit 190. FIG. 6C is a schematic diagram of a run preparation condition of the shutter unit 190. FIG. 6D is a schematic diagram of the shutter unit 190 while it is running.

The closed condition will be described with reference to FIG. 6A. The rear curtain 190A is pushed upward by a first spring 190E. That is, the rear curtain 190A is pushed by the first spring 190E in a direction where it is retracted from the opening 190D. The front curtain 190B is pushed upward by a second spring 190F. That is, the front curtain 190B is pushed by the second spring 190F in a direction where the opening 190D is shielded. A first magnetic piece 190H is attached to a rear curtain running member 190G. The rear curtain running member 190G is movable in the vertical direction, and is pushed downward by a third spring 190I. A second magnetic piece 190K is attached to a front curtain running member 190J. The front curtain running member 190J is movable in the vertical direction, and is pushed downward by a fourth spring 190L. The third spring 190I has a stronger pushing force than the first spring 190E. The fourth spring 190L has a stronger pushing force than the second spring 190F. The first spring 190E, the second spring 190F, the third spring 190I and the fourth spring 190L are attached, for example, to the shutter holding frame 190C.

When a first magnet coil 190M and a second magnet coil 190N are energized under the condition where the first magnet coil 190M is in contact with the first magnetic piece 190H and the second magnet coil 190N, with the second magnetic piece 190K, the first magnet coil 190M adheres fast to the first magnetic piece 190H and the second magnet coil 190N, to the second magnetic piece 190K by the magnetic force. The first magnet coil 190M and the second magnet coil 190N are attached, for example, to the shutter holding frame 190C. In the closed condition (FIG. 6A), the first magnet coil 190M and the second magnet coil 190N are not energized.

The rear curtain 190A and the front curtain 190B are movable in the vertical direction. The rear curtain 190A is provided with a first engagement portion 190P. The front curtain 190B is provided with a second engagement portion 190Q. A lower part of the rear curtain running member 190G and an upper part of the first engagement portion 190P come in contact with each other. The upper end of the vertical movement range of the first engagement portion 190P is the position of the rear curtain running member 190G.

A charging member 190R is movable in the vertical direction, and is pushed downward by a fifth spring 190S. The charging member 190R has a first pin 190T. The first pin 190T is engaged with a charging lever 190V. The charging lever 190V is driven by a cam member 190U. The cam member 190U is rotated by a shutter motor 161A (an example of the motor). In the closed condition (FIG. 6A), the cam member 190U applies no force to a second pin 190W of the charging lever 190V. Consequently, the charging member 190R and the charging lever 190V are situated below by the force of the fifth spring 190S.

The charging member 190R is capable of coming in contact with the lower side of the rear curtain running member 190G and the lower side of the front curtain running member 190J. In the closed condition (FIG. 6A), the charging member 190R is on the lower side. Consequently, by the pushing force of the third spring 190I, the rear curtain 190A shields the opening 190D against the pushing force of the first spring 190E. Further, by the pushing force of the fourth spring 190L, the front curtain 190B is retracted from the opening 190D against the pushing force of the second spring 190F.

A third pin 190X of the charging member 190R is engaged with a rotary lever 190Y. The rotation shaft of the rotary lever 190Y is fixed to the shutter holding frame 190C. The part of the rotary lever 190Y engaged with the third pin 190X of the rotary lever 190Y moves in the vertical direction together with the charging member 190R, whereby the rotary lever 190Y is rotated. A free end 190Z on the opposite side of the engaged part of the rotary lever 190Y moves oppositely in the vertical direction to the engaged part. The free end 190Z moves in a position where it can come in contact with the upper side of the second engagement portion 190Q of the front curtain 190B. In the closed condition (FIG. 6A), the free end 190Z is situated above, and the second engagement portion 190Q of the front curtain 190B is not in contact with the free end 190Z.

As described above, the shutter unit 190 is capable of being mechanically held in the closed condition (FIG. 6A).

Next, the opened condition will be described with reference to FIG. 6B. When the cam member 190U is rotated clockwise from the closed condition (FIG. 6A) by the shutter motor 161A (not shown), the second pin 190W engaged with the cam member 190U is pressed, so that the charging lever 190V is rotated counterclockwise. Then, the first pin 190T of the charging member 190R comes in contact with the charging lever 190V to push the first pin 190T upward. That is, the charging member 190R is moved upward against the pushing force of the fifth spring 190S. The charging member 190R comes in contact with the lower side of the rear curtain running member 190G and the lower side of the front curtain running member 190J to push the rear curtain running member 190G and the front curtain running member 190J upward. Then, the rear curtain 190A moves upward under the condition where the upper part of the first engagement portion 190P of the rear curtain 190A is in contact with the lower side of the rear curtain running member 190G by the force of the first spring 190E. The front curtain 190B moves upward under the condition where the upper part of the second engagement portion 190Q of the front curtain 190B is in contact with the lower side of the front curtain running member 190J by the force of the second spring 190F.

When the charging member 190R moves upward, the rotary lever 190Y rotates clockwise at the same time. When the upward movement of the charging member 190R advances, the free end 190Z of the rotary lever 190Y comes in contact with the upper part of the second engagement portion 190Q of the front curtain 190B. Then, the free end 190Z pushes down the second engagement portion 190Q. Then, the front curtain 190B moves downward together with the second engagement portion 190Q. When the cam member 190U is rotated to the condition shown in FIG. 6B and stopped, the members are also in the condition shown in FIG. 6B. Under this condition, the second pin 190W of the charging lever 190V runs on the cam surface having an arc shape concentric with the rotation center of the cam member 190U. Even though the second pin 190W is pressed against the cam surface, the force that rotates the cam member 190U does not act. Consequently, the pushing forces of the fifth spring 190S, the third spring 190I and the fourth spring 190L applied to the charging member 190R apply no rotative force to the cam member 190U. Therefore, the members are held in the condition shown in FIG. 6B even if the shutter motor 161A is not energized. Specifically, the cam member 190U and the second pin 190W are held in this condition. The charging member 190R is held in a condition of being situated above. The rear curtain running member 190G is held in a condition of being situated above by the charging member 190R. The first magnetic piece 190H is held in a condition of being pressed against the first magnet coil 190M. The front curtain running member 190J is held in a condition of being situated above by the charging member 190R. The second magnetic piece 190K is held in a condition of being pressed against the second magnet coil 190N. The rear curtain 190A is held in a condition of being retracted from the opening 190D by the force of the first spring 190E. The rotary lever 190Y is rotated clockwise and held in a condition where the free end 190Z is situated below. The front curtain 190B is held in a condition of being retracted from the opening 190D by the free end 190Z. In this condition, the first magnet coil 190M and the second magnet coil 190N are not energized. As described above, the opened condition of the shutter unit 190 is mechanically held. The shutter unit 190 is held in the opened condition (FIG. 6B), so that the optical path to the CMOS image sensor 110 is opened. As described above, the shutter unit 190 can be mechanically held in the opened condition (FIG. 6B) even if no power is supplied.

Next, the run preparation condition will be described with reference to FIG. 6C. When the user depresses the release button 131 of the camera body 100, a shift to the run preparation condition occurs. Specifically, the first magnet coil 190M and the second magnet coil 190N are energized. The first magnet coil 190M adheres to the first magnetic piece 190H. The second magnet coil 190N adheres to the second magnetic piece 190K. Thereafter, the cam member 190U rotates clockwise into the condition shown in FIG. 6C. Then, the charging lever 190V and the charging member 190R are released from the mechanically held condition. The charging member 190R is moved downward by the force of the fifth spring 190S. At this time, the rear curtain running member 190G and the front curtain running member 190J remain situated above by the magnetic forces of the first magnet coil 190M and the second magnet coil 190N. The retracted condition of the rear curtain 190A is held by the force of the first spring 190E.

Further, the rotary lever 190Y rotates counterclockwise to release the contact between the free end 190Z and the second engagement portion 190Q. Then, the front curtain 190B is moved up to a position where the second engagement portion 190Q and the front curtain running member 190J are in contact with each other by the force of the second spring 190F. That is, the front curtain 190B shields the opening 190D. Then, the front curtain 190B is held in the shielding condition. The charging member 190R is retracted from the downward running path of the rear curtain running member 190G and the front curtain running member 190J.

Next, the condition during running will be described with reference to FIG. 6D. During running, there is no change in the movements of the cam member 190U, the charging lever 190V, the charging member 190R and the rotary lever 190Y. When the power to the second magnet coil 190N is shut off in the run preparation condition (FIG. 6C), the adhesion between the second magnet coil 190N and the second magnetic piece 190K is released. Then, since the downward force by the fourth spring 190L applied to the front curtain 190B through the front curtain running member 190J is stronger than the upward force by the second spring 190F applied to the front curtain 190B, the front curtain 190B runs downward, that is, in a direction where the opening 190D is opened. When the power to the first magnet coil 190M is shut off after the front curtain 190B starts to run, the adhesion between the first magnet coil 190M and the first magnetic piece 190H is released. Then, since the downward force by the third spring 190I applied through the rear curtain running member 190G is stronger than the upward force by the first spring 190E applied to the rear curtain 190A, the rear curtain 190A moves downward, that is, in a direction where the opening 190D is shielded. The front curtain 190B and the rear curtain 190A run with a gap S being maintained. When the movement is completed, the closed condition (FIG. 6A) is brought about.

The light passing through the gap S between the front curtain 190B and the rear curtain 190A is incident on the CMOS image sensor 110. The opening formed by the gap S between the front curtain 190B and the rear curtain 190A moves in the downward direction in the figure, whereby the entire CMOS image sensor 110 is exposed. The exposure time of the CMOS image sensor 110 can be controlled by appropriately adjusting the size of the gap S. Specifically, the camera controller 140 controls the size of the gap S by controlling the time from the release of the front curtain 190B from the held condition to the release of the rear curtain 190A. Specifically, the camera controller 140 makes the time from the release of the front curtain 190B from the held condition to the release of the rear curtain 190A the same as the time during which the CMOS image sensor 110 is to be exposed.

Thereafter, when moving image capturing or the like by the CMOS image sensor 110 is performed, the cam member 190U is rotated from the shielding condition (FIG. 6A) to make a shift to the opened condition (FIG. 6B).

The above-described structure is an example of the shutter unit that is mechanically held in the opened condition. The cam member 190U, the charging lever 190V, the charging member 190R, the rotary lever 190Y, the first spring 190E and the like are an example of a mechanical lock mechanism that holds the opened condition of the shutter unit.

The optical low-pass filter 114 removes the high-frequency component of the subject light. More specifically, the optical low-pass filter 114 separates a subject image formed by the lens unit 200 so that the resolution is coarser than the pitch of the pixels of the CMOS image sensor 110. In general, the CMOS image sensor 110 or other imaging element has an RGB color filter called a Bayer pattern, or a YCM complementary color filter, provided for each pixel. Therefore, if the resolution goes to one pixel, not only will a false color be generated, but if the subject is a repeating pattern, an unattractive moire pattern will result. Furthermore, the optical low-pass filter 114 has an Ir cut filter function for cutting out infrared light.

The diaphragm 115 is disposed in front of the CMOS image sensor 110, and prevents dust from clinging to the CMOS image sensor 110. Also, any dust clinging to the diaphragm 115 itself is knocked off by the vibration of the diaphragm 115. More specifically, the diaphragm 115 is configured such that a thin, transparent sheet-like member is fixed to yet another member constituting the diaphragm 115 via a piezoelectric element. AC voltage is applied to the piezoelectric element, which causes the piezoelectric element to vibrate, and this vibrates the sheet-like member.

The protecting plate unit 172 is disposed between the body mount 150 and the CMOS image sensor 110 in the direction of the optical axis. The protecting plate unit 172 is disposed on the most body mount 150 side.

The protecting plate unit 172 includes: a protecting plate 172A; a protecting plate gear 172B that supports the protecting plate 172A; a protecting plate shaft 172C that passes through the protecting plate gear 172B to support the protecting plate gear 172B so as to be movable in one direction; a protecting plate retracting spring 172D that pushes the protecting plate 172A in a direction where the protecting plate 172A is retracted from the opening 190D; a driving partly tooth-missing gear 172I that drives the protecting plate gear 172B; and a planet gear mechanism described later. The protecting plate 172A is made of, for example, plastic or a metal.

The operation of the protecting plate unit 172 will be described with reference to FIGS. 7(a) to 7(c), 8(a) and 8(b).

FIG. 7(a) is a conceptual diagram showing a condition where the protecting plate 172A is retracted from the opening 190D of the shutter unit 190. The left side of FIG. 7(a) is a view viewed from the direction of the optical axis, and the right side thereof is a view viewed from a direction orthogonal to the optical axis.

In the image capturing possible condition, the shutter motor 161A maintains the condition where the shutter unit 190 is drivable. Specifically, the shutter motor 161A rotates only in the clockwise direction. A gear 161B that meshes with the shutter motor 161A rotates counterclockwise. A sun gear 172E of the planet gear mechanism that meshes with the gear 161B rotates clockwise. A planet carrier 172F supports the rotation shaft of the sun gear 172E and the rotation shaft of a planet gear 172G. The sun gear 172E and the planet carrier 172F are supplied with a load by a spring 172S. By the frictional force by the load, the planet carrier 172F rotates clockwise together with the sun gear 172E. The planet gear 172G that meshes with the sun gear 172E revolves clockwise around the sun gear 172E until it abuts on a stopper 172H1 while rotating counterclockwise. Under this condition, the planet gear 172G and the gear part of the cam member 190U mesh with each other. When the shutter motor 161A further rotates clockwise, the planet gear 172G rotates counterclockwise, and the cam member 190U rotates clockwise. At this time, the sun gear 172E rotates while producing friction with the planet carrier 172F abutting on the stopper 172H1. The above-described operation of the shutter unit 190 is performed by the rotation of the cam member 190U.

When the shutter motor 161A is reversed (rotated counterclockwise) from the above-described condition, the planet gear mechanism is brought into the condition shown in FIG. 7(a). When the power is turned off, for example, when the power switch 132 is turned off, or when it is detected that the lens is detached, the camera controller 140 controls the shutter motor 161A so as to rotate counterclockwise. Then, the shutter motor 161A rotates counterclockwise. The gear 161B rotates clockwise. The planet gear mechanism rotates counterclockwise until the planet carrier 172F abuts on a stopper 172H2. Specifically, the sun gear 172E and the planet carrier 172F both rotate counterclockwise. Under this condition, the planet gear 172G and the partly tooth-missing gear 172I mesh with each other. The planet gear 172G rotates clockwise.

The partly tooth-missing gear 172I is pushed clockwise to the condition shown in FIG. 7(a) by a partly tooth-missing gear spring 172J to abut on a stopper 172K. Consequently, the relation between the tooth-missing part of the partly tooth-missing gear 172I and the gear part of the protecting plate gear 172B is such that the relation shown in FIG. 7(a) is always held when image capturing is possible.

When the planet gear 172G rotates clockwise after the planet gear 172G and the partly tooth-missing gear 172I mesh with each other, the partly tooth-missing gear 172I rotates counterclockwise. Then, as shown in FIG. 7(b), the gear part of the partly tooth-missing gear 172I and the gear part of the protecting plate gear 172B mesh with each other. The protecting plate gear 172B is formed integrally with the protecting plate 172A. The protecting plate gear 172B and the protecting plate 172A move in a direction where the opening 190D is covered, against the pushing force of the protecting plate retracting spring 172D. FIG. 7(c) shows a condition where the shutter motor 161A is further rotated counterclockwise and the protecting plate 172A is further driven. In FIGS. 7(b) and 7(c), the structure other than the partly tooth-missing gear 172I and the protecting plate gear 172B is not shown.

Figures 8A, 8B:
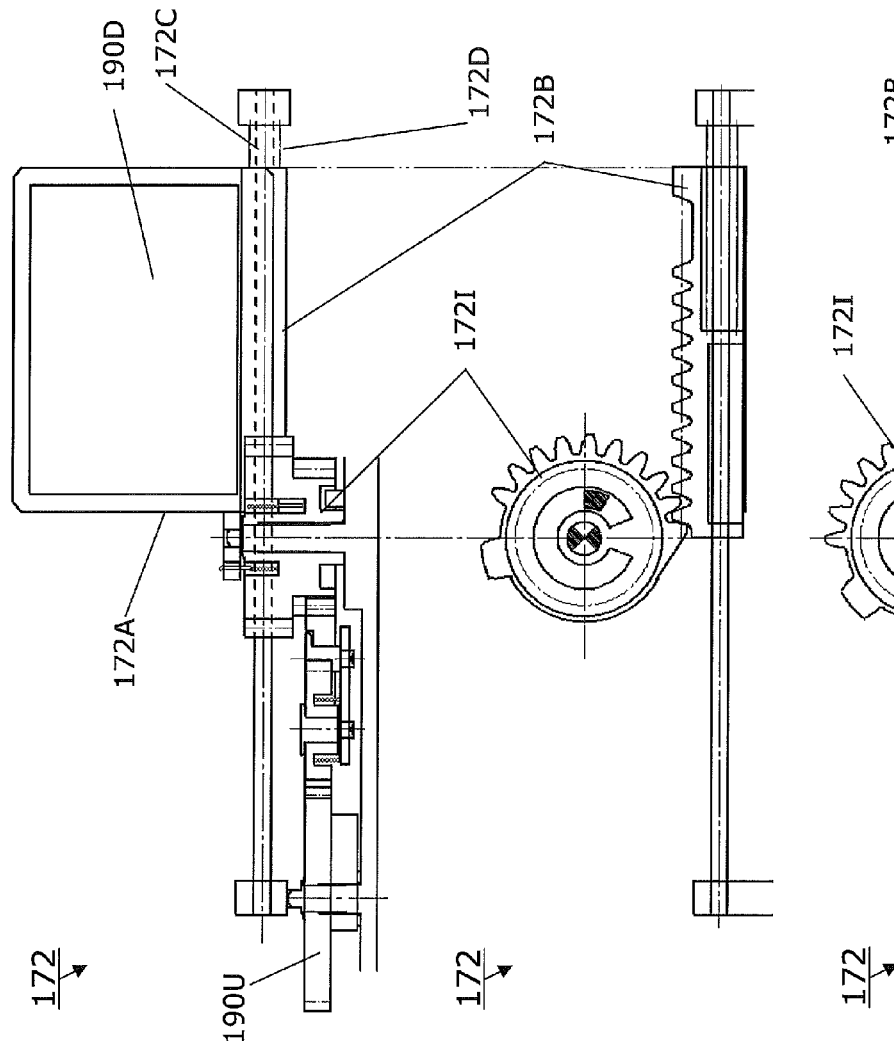
FIGS. 8(a) and 8(b) are schematic diagrams for explaining the driving mechanism of the protecting plate 172A of the first embodiment.

When the shutter motor 161A is further rotated counterclockwise, as shown in FIG. 8(a), the opening 190D is completely shielded by the protecting plate 172A. At this time, the position of the protecting plate 172A, the protecting plate gear 172B or the partly tooth-missing gear 172I is detected by a detector (not shown) such as a PI. Then, the camera controller 140 stops the rotation of the shutter motor 161A. At this time, the protecting plate 172A moves so that it returns to the retracted position by the spring forces of the partly tooth-missing gear spring 172J and the protecting plate retracting spring 172D. Then, a force of the partly tooth-missing gear 172I rotating clockwise is caused. However, the force of the partly tooth-missing gear 172I rotating clockwise acts so that the planet gear rotates counterclockwise. Since the rotation of the shutter motor 161A is stopped, the planet gear 172G cannot rotate the sun gear 172E clockwise. Further, the force of the partly tooth-missing gear 172I rotating clockwise acts so that the planet gear 172G revolves counterclockwise around the sun gear 172E. However, the planet gear 172G cannot move since the planet carrier 172F is in contact with the stopper 172H2. Therefore, the partly tooth-missing gear 172I cannot rotate clockwise. The protecting plate 172A is mechanically held in a condition of shielding the opening 190D. This condition is maintained even under the condition where the power supply to the shutter motor 161A is stopped. It is desirable that the shutter motor 161A be one requiring a force to rotate under the condition where power supply is stopped. Further, the mesh between the shutter motor 161A and the gear 161B may be made by a worm gear capable of self-locking. In FIGS. 8(a) and 8(b), the structure other than the partly tooth-missing gear 172I and the protecting plate gear 172B is not shown. The upper side of FIG. 8(a) is a view viewed from the direction of the optical axis, and the lower side thereof is a view viewed from the direction orthogonal to the optical axis. FIG. 8(b) is a view viewed from the direction orthogonal to the optical axis. FIGS. 8(a) and 8(b) show the members shown in FIGS. 7(a) to 7(c) that are rotated 90 degrees.

Then, when the power is turned on under the condition where the lens unit is attached or when the lens unit is attached under the condition where the power is on, the camera controller 140 controls the shutter motor 161A so as to further rotate counterclockwise. Then, as shown in FIG. 8(b), the tooth-missing part of the partly tooth-missing gear 172I comes to the position of the gear part of the protecting plate gear 172B. The partly tooth-missing gear 172I and the protecting plate gear 172B unmesh from each other. Then, the protecting plate gear 172B and the protecting plate 172A both return to the retracted positions by the spring force of the protecting plate retracting spring 172D. Further, the shutter motor 161A is slightly rotated clockwise. Thereby, the driving partly tooth-missing gear 172I and the planet gear mechanism unmesh from each other, and the driving partly tooth-missing gear 172I is returned to the initial position (the condition shown in FIG. 7(a)) by the partly tooth-missing gear spring 172J.

3: Configuration of Lens Unit

The lens unit 200 can be mounted to the camera body 100, and forms an optical image of a subject. More specifically, the lens unit 200 has an optical system L, a driver 215, the lens mount 250, an aperture unit 260, the lens controller 240, and a lens barrel 290.

The optical system L has a zoom lens group 210 for changing the focal length of the optical system L, an OIS (optical image stabilizer) lens group 220 for reducing blurring of the subject image with respect to the CMOS image sensor 110, and a focus lens group 230 for changing the focal state of the subject image formed on the CMOS image sensor 110.

The aperture unit 260 is a light quantity adjusting member that adjusts the quantity of light passing through the optical system. More specifically, the aperture unit 260 has aperture vanes (not shown) that can block part of the light rays incident on the optical system L, and an aperture driver (not shown) that drives the aperture vanes.

The lens controller 240 controls the entire lens unit 200 on the basis of control signals sent from the camera controller 140. More specifically, the lens controller 240 sends and receives signals to and from the camera controller 140 via the lens mount 250 and the body mount 150. The lens controller 240 receives position information about the optical system L detected by a detector included in the driver 215, and sends this information to the camera controller 140. The camera controller 140 processes the received position information and sends a control signal to the lens controller 240. The lens controller 240 receives the control signal issued by the camera controller 140, and transmits the control signal to the driver 215. The driver 215 adjusts the position of the zoom lens 210, the OIS lens 220, and the focus lens 230 on the basis of the control signal. Also, the camera controller 140 instructs the aperture unit 260 to operate on the basis of the amount of light received by the CMOS image sensor 110, whether moving image photography or still photography is being performed, whether or not an aperture value has been preferentially set with the controls, or other such information. At this point the lens controller 240 relays the instruction from the camera controller 140 to the aperture unit 260. The lens controller 240 also uses a DRAM 241 as a working memory during control. Also, a flash memory 242 stores programs and parameters used in control by the lens controller 240.

The lens barrel 290 mainly houses in its interior the optical system, the lens controller 240, the lens mount 250, and the aperture unit 260. A zoom ring 213, a focus ring 234, and an OIS switch 224 are provided on the outside of the lens barrel 290.

The zoom ring 213 is a cylindrical member that is able to rotate around the outer peripheral face of the lens barrel 290. The zoom ring 213 is an example of a control used to adjust the focal length.

The focus ring 234 is a cylindrical member that is able to rotate around the outer peripheral face of the lens barrel 290. The focus ring 234 is an example of a control used to adjust the focal state of a subject image formed on the CMOS image sensor 110 by the optical system L.

The OIS switch 224 is an example of a control used to adjust the OIS. The OIS lens 220 does not operate when the OIS switch 224 is off. The OIS lens 220 is able to operate when the OIS switch 224 is on.

4: Still Image Capturing Operation

When a still image capturing mode is selected by an operation of the control 130, the camera controller 140 controls the CMOS image sensor 110 so as to perform moving image capturing. The captured moving image is displayed on the camera monitor 120 or in the EVF 180. At this time, the moving image data is not recorded on the memory card 171. The user decides the composition with the camera monitor 120 or the EVF 180. AE control and AF control are performed based on the image data from the CMOS image sensor 110. At this time, the shutter unit 190 is mechanically held in the opened condition. Specifically, the rear curtain 190A is held in the opened condition (FIG. 6B) by the mechanical lock mechanism.

When the release button 131 is operated, the shutter unit 190 runs the rear curtain 190A and the front curtain 190B (FIG. 6D) by way of the run preparation condition (FIG. 6C), and exposes the CMOS image sensor 110. Then, the CMOS image sensor 110 obtains the still image data. The camera controller 140 performs predetermined image processing on the image data. The still image data or the still image file created based on the still image data is recorded on the memory card 171. Then, the camera controller 140 controls the shutter unit 190 so as to be mechanically held in the opened condition. Specifically, the cam member 190U is rotated to the condition shown in FIG. 6B by the shutter motor 161A, and the opened condition shown in FIG. 6B is held. Therefore, when the power supply from the power source 160 is stopped in the middle of the still image capturing mode, thereafter, the shutter unit 190 is held in the opened condition under the condition where the power supply from the power source 160 is stopped.

In the still image capturing mode, as shown in FIG. 7(*a*), the protecting plate 172A is held in a condition of being retracted from the opening 190D. When the still image capturing mode is selected under the condition where the protecting plate 172A is shielding the opening 190D, the camera controller 140 controls the driving of the shutter motor 161A so that the protecting plate 172A is retracted from the opening 190D.

5: Moving Image Capturing Operation

When a moving image capturing mode is selected by an operation of the control 130, the camera controller 140 controls the CMOS image sensor 110 so as to perform moving image capturing. The captured moving image is displayed on the camera monitor 120 or in the EVF 180. At this time, the moving image is not recorded on the memory card 171. The user decides the composition with the camera monitor 120 or the EVF 180. AE control and AF control are performed based on the image data from the CMOS image sensor 110.

When the control 130 is operated to provide an instruction to start moving image recording, the camera controller 140 performs predetermined image processing on the moving image data from the CMOS image sensor 110. The moving image data or the moving image file created based on the moving image data is recorded on the memory card 171. When the control 130 is operated to provide an instruction to stop moving image recording, the camera controller 140 stops the recording of the moving image data or the moving image file.

During this time, the camera controller 140 controls the shutter unit 190 so as to be mechanically held in the opened condition. Specifically, the shutter unit 190 is held in the opened condition shown in FIG. 6B. Therefore, when the power supply from the power source 160 is stopped in the middle of the moving image capturing mode, thereafter, the shutter unit 190 is held in the opened condition (FIG. 6B) under the condition where the power supply from the power source 160 is stopped.

In the moving image capturing mode, as shown in FIG. 7(*a*), the protecting plate 172A is held in a condition of being retracted from the opening 190D. When the moving image capturing mode is selected under the condition where the protecting plate 172A is shielding the opening 190D, the camera controller 140 controls the driving of the shutter motor 161A so that the protecting plate 172A is retracted from the opening 190D.

6: Operation When the Lens Unit is Interchanged

When determining that the lens unit 200 is to be detached or is being detached, the camera controller 140 drives the shutter motor 161A, and the protecting plate 172A shields the opening 190D of the shutter unit 190. The camera controller 140 makes the above-described determination, for example, based on the condition of the electric contact 153 or a lock pin 199 that unlocks the body mount 150 and the lens mount 250 when the lens unit 200 is detached. For the lock pin 199, whether it is in a locking condition or in an unlocking condition is detected. For the electric contact 153, whether the body mount 150 and the lens mount 250 are electrically connected with each other or not is detected. The camera controller 140 determines that the lens unit 200 is being detached, for example, when the body mount 150 and the lens mount 250 are not electrically connected with each other. Moreover, the camera controller 140 determines that the lens unit 200 is to be detached, for example, when the body mount 150 and the lens mount 250 are electrically connected with each other and the lock pin 199 is in the unlocking condition.

Further, when determining that the lens unit 200 is attached, the camera controller 140 drives the shutter motor 161A to drive the protecting plate 172A so as to retract from the opening 190D of the shutter unit 190. For example, the camera controller 140 determines that the lens unit 200 is attached when the body mount 150 and the lens mount 250 are electrically connected.

When the camera controller 140 determines that the lens unit 200 is being detached and the protecting plate 172A is shielding the opening 190D of the shutter unit 190, the control 130 accepts an operation of retracting the protecting plate 172A from the opening 190D. When the operation is performed, the camera controller 140 controls the protecting plate 172A so as to retract from the opening 190D. For example, when not a specifically designed lens unit attachable to the camera body 100 but a different lens unit is attached, even if the camera controller 140 cannot determine that the lens unit is attached, it is possible to open the protecting plate 172A and perform image capturing.

7: Operation When the Power Switch is Operated

When the power switch 132 is turned from on to off when the protecting plate 172A is retracted from the opening 190D, the camera controller 140 controls the shutter motor 161A so that it drives the protecting plate 172A so as to shield the opening 190D before the power supply from the power source 160 of the camera body 100 is stopped. Then, under the condition where the power supply from the power source 160 is stopped, the protecting plate 172A is mechanically held in the condition of shielding the opening 190D. Thereby, the shutter unit 190 and members behind the shutter unit 190 (for example, the CMOS image sensor 110) are protected by the protecting plate 172A even when the power is off.

When the power switch 132 is turned from off to on, the power source 160 of the camera body 100 starts the power supply to the members. Then, the camera controller 140 controls the shutter motor 161A so that it drives the protecting plate 172A so as to retract from the opening 190D.

An auxiliary power source such as a capacitor or a secondary battery may be provided in the camera body 100. In this case, after the power supply from the power source 160 of the camera body 100 is stopped, the protecting plate 172A is driven so as to shield the opening 190D of the shutter unit 190 by the power from the auxiliary power source.

8: Summary of the Operations of the Shutter Unit

As described above, in the camera body 100, the protecting plate 172A protects the shutter unit 190 and the members therebehind when the lens unit 200 is interchanged. Consequently, the risk of breakage of the members can be reduced when the lens unit 200 abnormally enters the camera body 100 or when a user's finger erroneously enters the camera body 100.

When the power supply from the power source 160 is stopped by the camera controller 140, the protecting plate 172A protects the shutter unit 190 and the members therebehind. Under the condition where the power supply from the power source 160 is stopped, it cannot be detected that the lens unit 200 is being detached from the camera body 100. That is, there are cases where the protecting plate 172A cannot be shielded after the lens unit 200 is detached from the camera body 100. However, in the camera body 100 according to the present embodiment, since the protecting plate 172A is in the shielded condition under the condition where the power supply from the power source 160 is stopped, the risk of breakage of the members can be reduced when the lens unit 200 abnormally enters the camera body 100 or when a user's finger erroneously enters the camera body 100.

Second Embodiment

Figure 9:
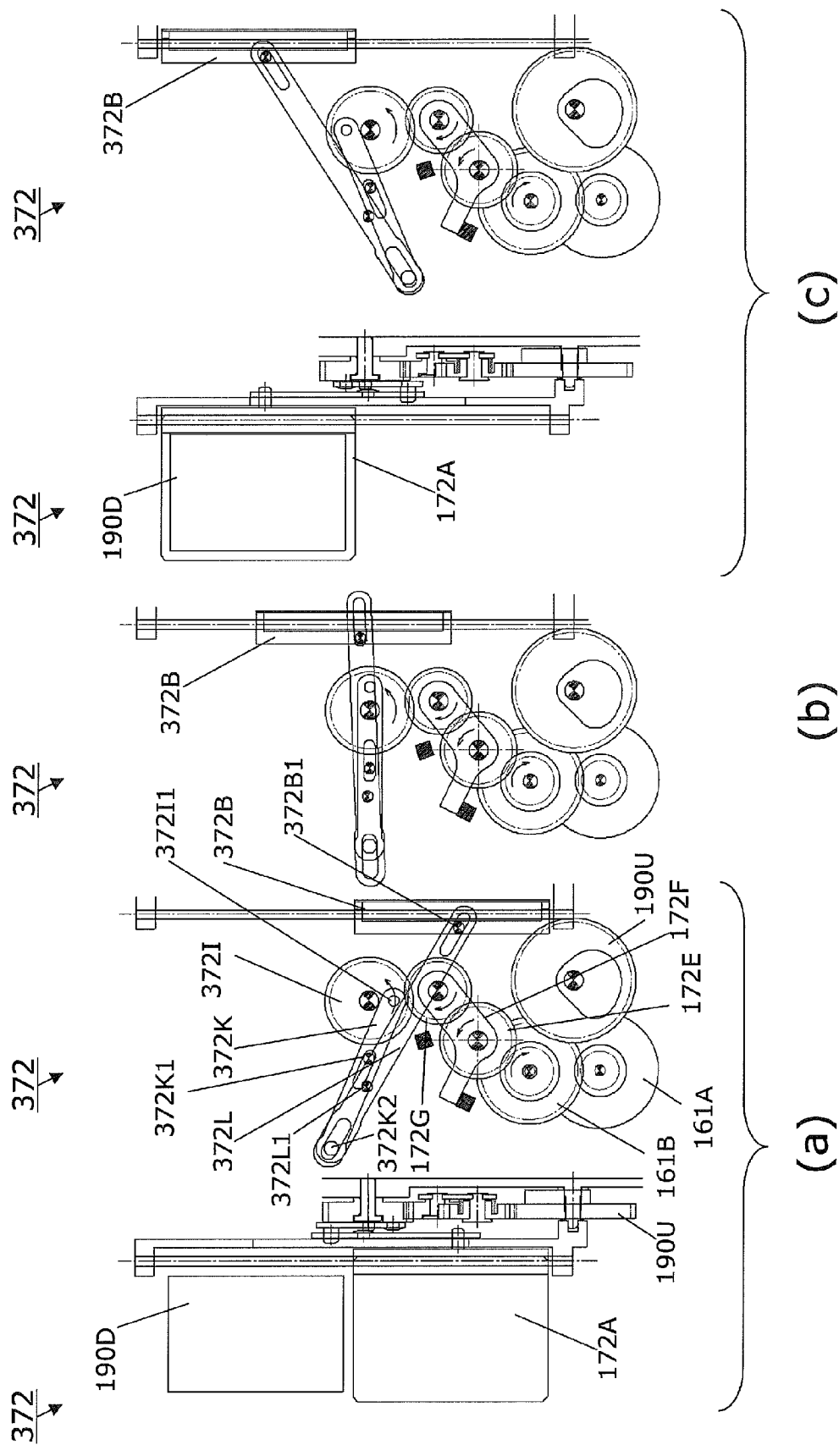
FIGS. 9(a) to 9(c) are schematic diagrams for explaining the driving mechanism of the protecting plate 172A according to a second embodiment.

Only a difference from the camera body 100 of the first embodiment will be described, and descriptions of common parts are omitted. The same members as those of the first embodiment are denoted by the same reference numerals. FIGS. 9(a) to 9(c) are schematic views for explaining the driving mechanism of the protecting plate 172A of the second embodiment. The difference from the first embodiment is a protecting plate unit 372. The operation of the protecting plate 172A is the same as that of the first embodiment. For example, the timing when the protecting plate 172A is driven is the same as that of the first embodiment.

A protecting plate holding piece 372B is integrally fixed to the protecting plate 172A. The protecting plate holding piece 372B has a driving pin 372B1. FIG. 9(a) shows a condition immediately after the shutter motor 161A is reversed (rotated counterclockwise) from the image capturing standby condition. The left side of FIG. 9(a) is a view viewed from the direction of the optical axis, and the right side thereof is a view viewed from the direction orthogonal to the optical axis.

When driving the protecting plate 172A to the opening 190D from the condition where the protecting plate 172A is retracted from the opening 190D, the shutter motor 161A rotates counterclockwise. Then, the gear 161B, the sun gear 172E, the planet carrier 172F and the planet gear 172G rotate. Up to this point, the operation is the same as that of the first embodiment. Then, the planet gear 172G and a link gear 372I mesh with each other.

The link gear 372I rotates counterclockwise. A link pin 372I1 provided on the link gear 372I rotates about the rotation shaft of the link gear 372I. The link pin 372I1 is engaged with an end of a first link lever 372K. The link pin 372I1 is rotatable with respect to the first link lever 372K. The end of the first link lever 372K rotates about the rotation shaft of the link gear 372I together with the link pin 372I1. The first link lever 372K is supported by a fixed shaft 372K1, and is rotatable about the fixed shaft 372K1. To the end on the opposite side of the end of the first link lever 372K, a pin 372K2 is fixed.

A second link lever 372L is supported by a fixed shaft 372L1, and is rotatable about the fixed shaft 372L1. An elongate hole is formed at each end of the second link lever 372L. One of the elongate holes is slidably engaged with the pin 372K2, and the other is slidably engaged with the driving pin 372B1.

With the counterclockwise rotation of the link gear 372I, the members move as successively shown in FIGS. 9(b) and 9(c). Then, the protecting plate 172A shields the opening 190D. FIG. 9(b) is a view viewed from the direction orthogonal to the optical axis. The left side of FIG. 9(c) is a view viewed from the direction of the optical axis, and the right side thereof is a view viewed from the direction orthogonal to the optical axis.

That the protecting plate 172A is situated in a position where it is retracted from the opening 190D and that the protecting plate 172A is situated in a position where it shields the opening 190D are detected by a position detector (not shown). A body controller 149 controls the shutter motor 161A based on the result of the detection by the position detector.

When the shutter motor 161A is further rotated counter-clockwise from the condition shown on FIG. 9(c), the condition shown in FIG. 9(a) is brought about by way of the condition shown in FIG. 9(b). Then, the protecting plate 172A is retracted from the opening 190D.

Other Embodiments

Embodiments are not limited to those discussed above, and various changes and modifications are possible without departing from the gist of the present invention. Also, the above embodiments are basically just favorable examples, and are not intended to limit the present invention, its applications, or the scope of these applications.

(A) In the above embodiments, the digital camera was capable of capturing both moving and still pictures, but may instead be capable of capturing just still pictures, or just moving pictures.

(B) The protecting plate may shield an opening of the body mount 150 instead of shielding the opening 190D.

(C) In the above-described first and second embodiments, the shutter unit 190 is controlled so as to be mechanically held in the opened condition under the condition where the power of the camera body 100 is off, by the camera controller 140 before the power is turned off. However, the shutter unit 190 may be in the closed condition under the condition where the power of the camera body 100 is off.

(D) The shutter unit 190 is provided in the embodiments above, but the shutter unit 190 need not be provided, and the same shutter function as the shutter unit 190 may be realized by drive control of the CMOS image sensor 110. More specifically, the CMOS image sensor 110 successively resets the charge of each pixel from the line above. The charges of the pixels are read out successively from the line above so as to track the downward movement of the line resetting operation. Doing this allows each pixel to be exposed within the period of time from the point of resetting until the charge is read, and allows image data to be formed depending on the acquired charges.

(E) In the embodiments above, the camera monitor 120 and the EVF 180 are both provided, but the configuration may instead be such that only one of these is provided.

(F) In addition to the CMOS image sensor 110, the imaging element may be a CCD image sensor.

(G) The hinge 121 that couples the camera monitor 120 to the exterior 101 so as to be rotatable may be disposed at the lower end of the exterior 101. In this case, the camera monitor 120 is rotatable in the vertical direction with respect to the exterior 101, and is also rotatable in the horizontal direction with respect to the exterior 101 about a second hinge.

Features of the Embodiments

Characterizing parts of the above-described embodiments will be listed below. The inventions included in the above-described embodiments are not limited to the ones shown below. Parenthesized reference numerals following elements indicate concrete examples of the elements shown to aid the understanding of the features. The elements are not limited to these concrete examples. The effect mentioned with respect to each feature is obtained even if a structure other than the described feature is modified or deleted.

—F1—

A camera body (100) comprising:
a body mount (150) that supports an attachable lens unit (200);
an imaging element (110) that captures an optical image of a subject and generates image data;
a shutter unit (190) disposed between the body mount and the imaging element;
a protecting plate (172A) that has a first condition of shielding an opening of the shutter unit and a second condition of retracting from the opening of the shutter unit;
a motor (161A) that drives the protecting plate;
a power source (160) operable to supply power; and
a camera controller (140) that controls the motor before power supply from the power source is turned off, so that the protecting plate is in the first condition when the power supply from the power source is off.

(Effect) A highly reliable camera body of an interchangeable-lens-type digital camera can be provided. For example, the risk of breakage of the members can be reduced when the lens unit abnormally enters the camera body or when a user's finger erroneously enters the camera body.

—F2—

The camera body according to F1, wherein
the camera controller determines whether the lens unit is attached or not to the body mount, and when determining that the lens unit is not attached to the body mount, the camera controller controls the motor so as to insert the protecting plate in the opening of the shutter unit.

(Effect) It is prevented that the user forgets to operate the protecting plate.

—F3—

The camera body according to F1, wherein
the motor further drives the shutter unit.

(Effect) One motor can be used as both the motor to drive the protecting plate and the motor to drive the shutter unit, so that the size of the camera body can be reduced.

—F4—

The camera body according to F3, wherein
the motor rotates in a first direction to drive the shutter unit, and rotates in a second direction opposite to the first direction to drive the protecting plate.

(Effect) Switching between the driving of the shutter unit and the driving of the protecting plate is facilitated.

—F5—

The camera body according to F4, further comprising
a planet gear mechanism, wherein
the planet gear mechanism (172F, etc.) is meshed with the shutter unit by a rotation of the motor in the first direction, and is meshed with a protecting plate unit that drives the protecting plate by a rotation of the motor in the second direction.

(Effect) The switching mechanism is simplified, so that the size of the camera body is reduced.

—F6—

The camera body according to F2, further comprising
an operation portion (130) that accepts an operation of retracting the protecting plate from the opening of the shutter unit, wherein
when the camera controller determines that the lens unit is not attached to the body mount and the operation portion is operated, the camera controller controls the protecting plate so as to retract it from the opening of the shutter unit.

(Effect) When not a specifically designed lens unit attachable to the camera body but a different lens unit is attached, even if the camera controller cannot determine that the lens unit is attached, it is possible to open the protecting plate and perform image capturing.

—F7—

The camera body according to F1, wherein
the camera controller controls the shutter unit before the power supply from the power source is turned off, so that the shutter unit is mechanically held in an opened condition when the power supply from the power source is off.

(Effect) The shutter unit is in the opened condition even after the power supply is stopped. The risk of breakage of the shutter unit is reduced even when the protecting plate is broken.

—F8—

The camera body according to F1, wherein
the protecting plate is disposed between the shutter unit and the body mount.

(Effect) The shutter unit is effectively protected.

—F9—

The camera body according to F1, wherein
the protecting plate is capable of being mechanically held in a condition of shielding the opening of the shutter unit.

(Effect) The condition where the opening is shielded by the protecting plate can be held even after the power supply is stopped.

—F10—

A camera body (100) comprising:
a body mount (150) that supports an attachable lens unit;
an imaging element (110) that captures an optical image of a subject and generates image data;
a protecting plate (172A) that has a first condition of shielding an opening of the body mount and a second condition of retracting from the opening of the body mount;
a motor (161A) that drives the protecting plate;
a power source (160) operable to supply power; and
a camera controller (140) that controls the motor before power supply from the power source is turned off, so that the protecting plate is in the first condition when the power supply from the power source is off.

(Effect) A highly reliable camera body of an interchangeable-lens-type digital camera can be provided. For example, the risk of breakage of the members can be reduced when the lens unit abnormally enters the camera body or when a user's finger erroneously enters the camera body.

What is claimed is:

1. A camera body comprising:
a body mount that supports an attachable lens unit;
an imaging element that captures an optical image of a subject and generates image data;
a shutter unit disposed between the body mount and the imaging element;
a protecting plate that has a first condition of shielding an opening of the shutter unit and a second condition of retracting from the opening of the shutter unit, the protecting plate being disposed adjacent to the shutter unit;
a motor that drives the protecting plate;
a power source operable to supply power; and
a camera controller that controls the motor before power supply from the power source is turned off, so that the protecting plate is in the first condition when the power supply from the power source is off.

2. The camera body according to claim 1, wherein
the camera controller determines whether the lens unit is attached or not to the body mount, and when determining that the lens unit is not attached to the body mount, the camera controller controls the motor so as to insert the protecting plate in the opening of the shutter unit.

3. The camera body according to claim 2, further comprising
an operation portion that accepts an operation of retracting the protecting plate from the opening of the shutter unit, wherein
when the camera controller determines that the lens unit is not attached to the body mount and the operation portion is operated, the camera controller controls the protecting plate so as to retract it from the opening of the shutter unit.

4. The camera body according to claim 1, wherein
the motor further drives the shutter unit.

5. The camera body according to claim 4, wherein
the motor rotates in a first direction to drive the shutter unit, and rotates in a second direction opposite to the first direction to drive the protecting plate.

6. The camera body according to claim 5, further comprising
a planet gear mechanism, wherein
the planet gear mechanism is meshed with the shutter unit by a rotation of the motor in the first direction, and is meshed with a protecting plate unit that drives the protecting plate by a rotation of the motor in the second direction.

7. The camera body according to claim 1, wherein
the camera controller controls the shutter unit before the power supply from the power source is turned off, so that the shutter unit is mechanically held in an opened condition when the power supply from the power source is off.

8. The camera body according to claim 1, wherein
the protecting plate is disposed between the shutter unit and the body mount.

9. The camera body according to claim 1, wherein
the protecting plate is capable of being mechanically held in a condition of shielding the opening of the shutter unit.

10. A camera body comprising:
a body mount that supports an attachable lens unit;
an imaging element that captures an optical image of a subject and generates image data;
a shutter unit disposed between the body mount and the imaging element;
a protecting plate that has a first condition of shielding a first opening of the body mount and a second opening of the shutter unit and a second condition of retracting from the first opening of the body mount, the protecting plate being disposed adjacent to the shutter unit;
a motor that drives the protecting plate;
a power source operable to supply power; and
a camera controller that controls the motor before power supply from the power source is turned off, so that the protecting plate is in the first condition when the power supply from the power source is off.

11. A camera body comprising:
a body mount that supports an attachable lens unit;
an imaging element that captures an optical image of a subject and generates image data;
a shutter unit disposed between the body mount and the imaging element;

a protecting plate that has a first condition of shielding an opening of the shutter unit and a second condition of retracting from the opening of the shutter unit;

a motor that drives the protecting plate;

a power source operable to supply power; and a camera controller that controls the motor before power supply from the power source is turned off, so that the protecting plate is in the first condition when the power supply from the power source is off, wherein the camera body is a mirror-less type of camera body.

12. The camera body according to claim 11, wherein the protecting plate is disposed adjacent to the shutter unit.

* * * * *